March 12, 1957  W. E. LEWIS ET AL  2,785,266
ELECTRIC RANGE WITH AUTOMATIC GRIDDLE ATTACHMENT
Filed Dec. 5, 1955
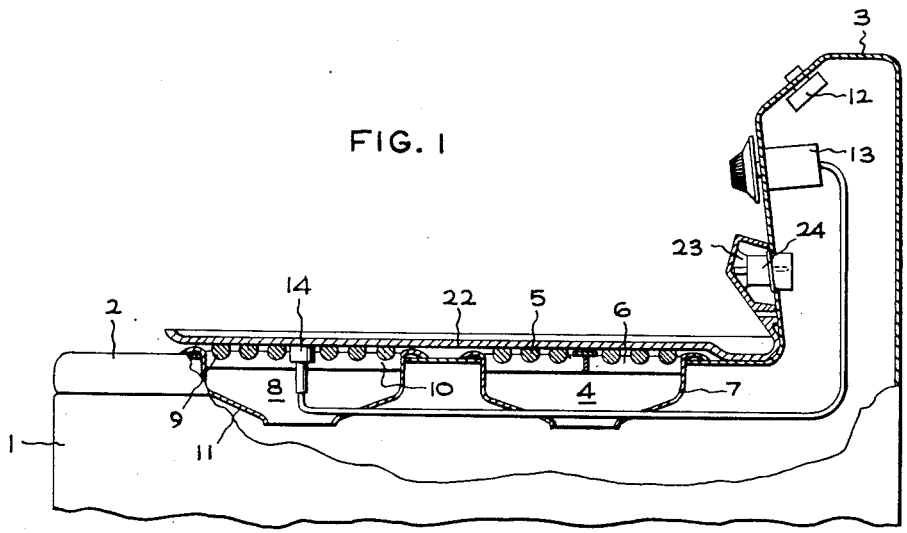
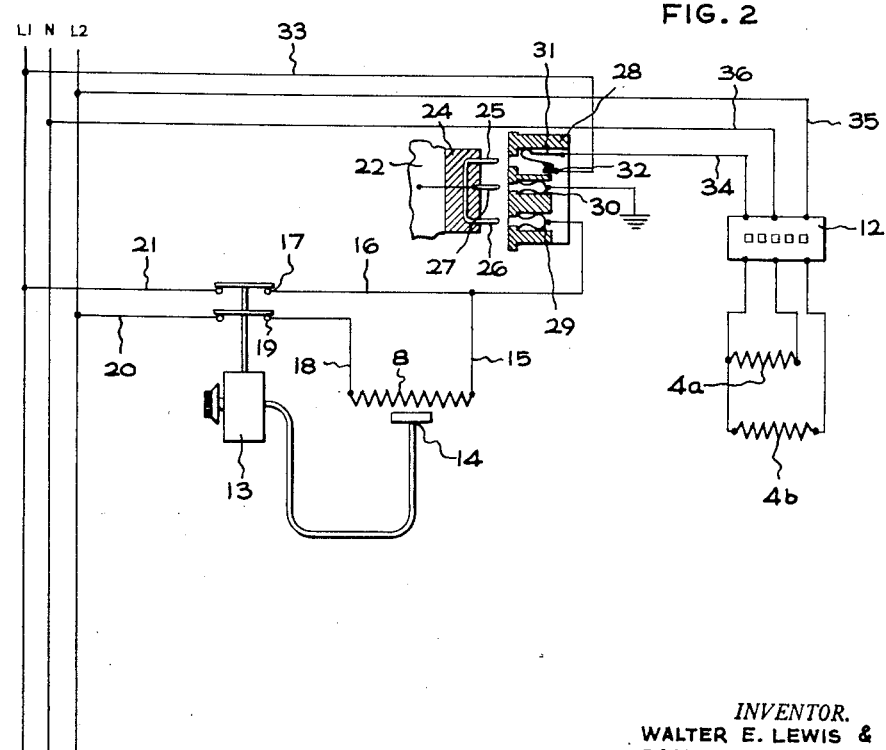
INVENTOR.
WALTER E. LEWIS &
SAMUEL C. JORDAN
BY
THEIR ATTORNEY

2,785,266

ELECTRIC RANGE WITH AUTOMATIC GRIDDLE ATTACHMENT

Walter E. Lewis, Louisville, and Samuel C. Jordan, Lyndon, Ky., assignors to General Electric Company, a corporation of New York Application December 5, 1955, Serial No. 551,103

4 Claims. (Cl. 219—20)

This invention relates to electrically heated cooking apparatus and more particularly to an electric range including a thermostatically controlled surface cooking system.

Many electric ranges are now equipped with a thermostatically controlled surface cooking unit, usually including a temperature sensitive element mounted centrally in the unit so as to be in contact with a utensil placed thereon, and an adjustable thermostat adapted to control the energization of the heating unit in accordance with the temperature sensed by the temperature sensing element. In one range of this type, for example, four surface cooking units are clustered in a generally rectangular arrangement on the cooking top, three of the heating units being provided with non-automatic heat control switches, and the four unit being equipped with an automatic temperature responsive control system. While this arrangement has proved to be extremely useful, particularly in griddle type frying operations in which close temperature control is extremely important, space limitations have prohibited the heating under automatic control of large utensils having an area substantially greater than the area of the heating unit itself.

Accordingly, a principal object of this invention is to provide a thermostatically controlled surface cooking system adapted to accommodate utensils of widely varying sizes.

Another object of this invention is to provide a thermostatically controlled surface cooking system adapted to accommodate utensils so large that they extend over a pair of adjacent surface cooking units.

Another object of this invention is to provide an electric range equipped with a thermostatically controlled cooking system arranged to control a pair of surface cooking units so as to regulate the surface temperature of a griddle extending over both units.

Further objects and advantages of our invention will become apparent as the following description proceeds, and the features of novelty which characterize our invention will be pointed out with particularity in the claims annexed to and forming a part of this specification.

Briefly stated, in accordance with one aspect of our invention, we provide a range having a pair of adjacent surface heating units, only one of which is provided with an automatic temperature responsive control system, a cooking utensil, such as a griddle, of a size such that it extends over both heating units and a system for arranging the heating unit circuits so as to control the energization and de-energization of both heating units in accordance with the temperature of the utensil.

For a better understanding of our invention, reference may be made to the accompanying drawing in which:

Fig. 1 is a fragmentary elevation view, partly in section, of an electric range embodying our invention.

Fig. 2 is a diagrammatic view showing the control system of our invention.

Referring to the drawing the numeral 1 designates an electric range including a cooking top 2, a backsplasher 3 at the rear thereof, and a surface cooking unit 4 supported on cook top 2 adjacent backsplasher 3. Surface heating unit 4 may be of any well known type, but is preferably of the type including a sheathed heating unit 5 coiled in flat spiral form supported on a spider assembly 6 and provided with a reflector pan 7. Also mounted on cook top 2 is another surface cooking unit 8 comprising a sheathed heating unit 9 coiled in flat spiral form and supported on a spider assembly 10 and equipped with a reflector 11.

To provide the usual series of wattage outputs required during various cooking operations, heating unit 4 is energized through a wattage control switch 12 which may be a push button switch of the type shown in Andrews Patent 2,431,904, a rotary switch of the type shown in Illian Patent 2,483,831 or any other suitable wattage control switch. In the illustrated embodiment of our invention, a switch of the type shown in the Andrews patent is utilized and hence heating unit 4 includes a two coil heating element having sections 4a and 4b which may be connected in various circuit combinations with a three wire 230–115 volt power supply system so as to provide a series of five wattage levels.

Heating unit 8 is energized through a thermostatic switch 13 including a temperature sensing bulb 14 supported centrally within the innermost coil of heating element 9 so as to rest in heat transfer relation with a utensil supported on the unit. Heating unit 8 includes a single resistance coil connected at one end by means of electrical conductors 15 and 16 to terminal 17 of thermostat 13 and at its other end by means of conductor 18 to terminal 19 of the thermostat. Thermostat 13 is connected by means of conductors 20 and 21 to lines L1 and L2 of the power source L1, L2 from which range 1 is energized, and hence heating unit 8 is periodically energized at 230 volts in accordance with the temperature of temperature sensing head 14.

In performing griddle-type frying operations, it is particularly important that the temperature of the griddle be maintained within relatively narrow limits, and also it is desirable that the griddle have a rather large area so that a number of large items such as pancakes, for example, may be cooked simultaneously. Accordingly, we have provided a large griddle 22 made of aluminum, for example, adapted to rest on and to be heated by heating units 4 and 8, and a control system so arranged that not only heating unit 8 but also heating unit 4 is thermostatically controlled in accordance with the temperature sensed by temperature detector 14. Furthermore, we provide means for converting heating unit 4 from manual to automatic operation which may be actuated by placement of griddle 22 in position on heating units 4 and 8. As shown in Fig. 1, griddle 22 is provided with a housing portion 23 at one end thereof in which is mounted a plug assembly 24 comprising a shorting bar including contact blades 25 and 26 imbedded in a block of insulating material. Plug assembly 24 may also include a grounding blade 27 electrically connected to the griddle structure.

Plug 24 is adapted to cooperate with and engage an electrical receptacle 28 mounted on backsplasher 3 adjacent heating unit 4. Receptacle 28 includes a contact member 29 adapted to cooperate with blade 26 of plug 24, a contact member 30 grounded to the frame of range 1 and adapted to cooperate with blade 27, and a contact member 31 adapted to be engaged by a blade 25. It will be noted that contact member 31 includes a switch element 32 which is closed unless blade 25 is inserted in contact with member 31. Switch 32 is connected in circuit with heat control switch 12 by means of a conductor 33 connected to power supply line L1, and a conductor 34 connected to contact member 31 and to the particular terminal of switch 12 through which current flows during energization of heating unit 4 at any of the selected wattage levels provided by the switch. In other words, in all of the circuits which provide the various wattage levels, a particular one of the three line conductors connected to pushbutton 12 is utilized and it is this conductor in which switch element 32 is connected; the other line conductor 35 connected to power supply line L2 and neutral conductor 36 may be open or closed condition depending on the particular circuit selected.

From the foregoing description it will be seen that whenever plug 24 is removed from receptacle 28, switch 12 is connected to the power source by means of conductors 35 and 36 which are connected directly to line L2 and the neutral line respectively, and power supply line L1 by a circuit including conductor 33, switch element 32, contact member 31 and conductor 34. Hence in this condition surface heating unit 4 may be controlled so as to produce various wattage output levels as described in the aforesaid Andrews patent. Also, of course, heating unit 8 is individually controlled by thermostat 13 and may be operated so as to maintain any desired cooking temperature within a utensil placed on the heating unit.

In using griddle 22 in accordance with our invention, the griddle is placed in the position shown in Fig. 1, plug 24 being inserted into receptacle 28 so that contact blades 25 and 26 engage contact members 31 and 29 respectively. In this position, of course, the griddle is in heat transfer relation with both heating unit 4 and heating unit 8 so as to provide uniform heating over its entire surface. Insertion of contact blade 25 into engagement with contact member 31 opens switch element 32 by virtue of the movement of the spring arm portion of the contact member in the contact opening direction. With the griddle 22 in the position shown in Fig. 1 the energizing circuit for heating unit 4 is changed and may be traced from switch 12 through conductor 34, contact member 31, contact blade 25, contact blade 26, contact member 29 of the receptacle 28 and through conductor 16 to terminal 17 of thermostat 13. Thus if switch 12 is actuated to a heating position and thermostat 13 is adjusted so as to obtain a desired griddle temperature, heating unit 4 will be energized and de-energized simultaneously with heating unit 8. Hence griddle 22 may be heated uniformly in accordance with the griddle temperature as sensed by temperature detector 14.

From the foregoing description, it will be seen that we have provided an automatic griddle attachment for electric ranges which is simple and rugged in construction, because it contains no electrical controls or moving parts. Furthermore, the control arrangement is simple and relatively inexpensive since it includes components housed within the range body which perform other cooking functions when the griddle is not in use.

While we have shown and described a specific embodiment of our invention, we do not desire our invention to be limited to the particular construction shown and described, and we intend by the appended claims to cover all modifications within the true spirit and scope of the invention.

What we claim is:

1. An electric range comprising first and second adjacent surface heating units, thermostatic means for controlling the energization of said first heating unit in accordance with the temperature of a utensil supported thereon, switch means for regulating the energization of said second heating unit, a griddle adapted to be supported on and to extend over both of said heating units, and means for connecting said second heating unit in circuit with said thermostatic means so as to be controlled concurrently with said first heating unit, said connecting means including means actuated by placement of said griddle in a predetermined position on said heating units.

2. An electric range comprising a cooktop, a backsplasher at the rear of said cooktop, a first electric surface heating unit mounted on said cooktop adjacent said backsplasher, a second electric surface heating unit mounted on said cooktop between the front edge thereof and said first heating unit, an energizing circuit for said first heating unit including a heat control switch for regulating the wattage output of said first heating unit, an energizing circuit for said second heating unit including an adjustable thermostat responsive to the temperature of a utensil placed thereon, and means for connecting said first heating unit in circuit with said thermostat so that its energization is controlled concurrently with said second heating unit, said connecting means including first and second cooperating elements mounted respectively on said backsplasher and on a griddle adapted to rest on said cooktop in heat transfer relation with said first and second heating units.

3. An electric range in accordance with claim 1 in which the energizing circuit for said first heating unit includes a conductor connecting one terminal of said heat control switch to one power supply line of a source of electrical energy, a normally closed switch element in said conductor, said first cooperating element of said connecting means comprising a receptacle enclosing said switch element, a first contact member connected in circuit with said first terminal of said heat control switch, and a second contact member connected in circuit with said thermostat so as to be connected to said power supply line when the contacts of said thermostat are closed, and said second cooperating element including a shorting bar having terminal blades engageable with said first and second contact members and operable to open said switch element upon insertion thereof into said receptacle.

4. An electric range control system in accordance with claim 3 in which said switching means includes an electrical receptacle mounted on said range adjacent to said heating units, said receptacle comprising a first contact member connected in circuit with said first conductor and including a normally closed switch element movable to open position in which the circuit through said first conductor is interrupted, a second contact member connected in circuit with said thermostatic switch so as to be in circuit with said third conductor when the contacts of said thermostatic switch are closed, and a pair of interconnected contact blades engageable with said contact members so as to move said switch element to open position and electrically connect said thermostatic switch and said heat control switch, said contact blades being carried by a utensil adapted to rest in heat transfer relation with both of said heating units.

References Cited in the file of this patent

UNITED STATES PATENTS

| 2,668,223 | McCormick | Feb. 2, 1954 |
| 2,704,320 | Crawford | Mar. 15, 1955 |
| 2,704,803 | Crowley | Mar. 22, 1955 |

FOREIGN PATENTS

| 651,733 | Great Britain | Apr. 11, 1951 |